United States Patent [19]

Gamper et al.

[11] Patent Number: 5,794,314

[45] Date of Patent: Aug. 18, 1998

[54] COLLAPSED TUBING HOLDERS

[75] Inventors: Joseph W. Gamper; James W. Smith, both of Rock Springs, Wyo.; Guy L. McClung, III, Spring, Tex.

[73] Assignee: Weatherford/Lamb, Inc., Houston, Tex.

[21] Appl. No.: 827,657

[22] Filed: Apr. 9, 1997

[51] Int. Cl.⁶ ..................................................... A44B 21/00
[52] U.S. Cl. ................................. 24/517; 24/521; 24/543
[58] Field of Search ............................... 24/517, 519, 520, 24/521, 543

[56] References Cited

U.S. PATENT DOCUMENTS

| | | | |
|---|---|---|---|
| 341,365 | 5/1886 | Wilson | 24/517 |
| 1,296,515 | 3/1919 | Hays | 24/517 |
| 1,428,385 | 9/1922 | Meredith et al. | |
| 1,601,369 | 9/1926 | Montgomery | |
| 1,664,461 | 4/1928 | Montgomery | |
| 1,890,386 | 12/1932 | Kingston | |
| 1,920,617 | 8/1933 | Young et al. | |
| 2,301,625 | 11/1942 | Johnson | |
| 3,405,429 | 10/1968 | Vazquez | 24/543 |
| 3,422,524 | 1/1969 | Timmons | |
| 3,736,629 | 6/1973 | Blake | 24/248 |
| 3,766,925 | 10/1973 | Rubricius | 24/543 |
| 3,843,168 | 10/1974 | Morrill et al. | 285/24 |
| 4,053,135 | 10/1977 | Saliaris | 24/543 |
| 4,138,145 | 2/1979 | Lawrence | 285/23 |
| 4,382,453 | 5/1983 | Bujan et al. | 24/543 |
| 4,416,038 | 11/1983 | Morrone, III | 24/543 |
| 5,409,280 | 4/1995 | Hill | 294/16 |
| 5,428,871 | 7/1995 | Iosif | 24/543 |
| 5,695,161 | 12/1997 | Brozak, Jr. | 24/543 |

*Primary Examiner*—Victor N. Sakran
*Attorney, Agent, or Firm*—Guy McClung

[57] ABSTRACT

A holder for holding collapsed coiled tubing has been invented which, in one aspect, has a first plate, a second plate, securement apparatus for releasably securing the plates together in a spaced-apart relationship about at least one portion of a collapsed tubular, e.g. but not limited to coiled tubing, and at least one gripper or gripping element on one plate for gripping the collapsed tubular between the first plate and second plate. In one aspect such a holder has gripping elements which include a first die device on the first plate and a second die device on the second plate, the first die device disposed opposite the second die device when the holder is installed around a collapsed tubular. In one aspect dies are longitudinally offset with respect to upper and/or lower dies so that gripping is achieved across a wider portion or substantially all of the width of a collapsed tubular. In one aspect such a holder is an elevator with an elevator hook on each plate so the holder serves as an elevator. A gripping element has been invented for gripping a tubular or collapsed coiled tubing having a non-round shape, the gripping element having a surface with a shape corresponding to a shape of a portion of the non-round tubular or collapsed coiled tubing.

12 Claims, 2 Drawing Sheets

5,794,314

COLLAPSED TUBING HOLDERS

BACKGROUND OF THE INVENTION

1. Field of the Invention

The present invention is directed to tubular holders and, in one particular aspect, to holders for tubing. In one specific embodiment the present invention is directed to holders for collapsed coiled tubing.

2. Description of Related Art

The prior art discloses a wide variety of holders, elevators, and slips for releasably holding tubulars used in wellbore operations, such as pipe, casing tubing, and coiled tubing. Often in using coiled tubing, the tubing collapses. A device is needed to hold collapsed coiled tubing.

SUMMARY OF THE PRESENT INVENTION

The present invention, in certain embodiments, discloses devices and apparatus for holding tubulars. In one aspect, such devices and apparatuses are useful to hold collapsed coiled tubing.

FIG. 1 shows three common types of coiled tubing. FIGS. 2A and 2B show two common coiled tubing types, A and B, in an undesirable collapsed state. When such collapse occurs, operators still must handle and manipulate the collapsed tubing.

In one embodiment the present invention discloses a tubular holder having two opposed plates with selectively releasable apparatus, e.g. but not limited to bolt-nut combinations, for securing the two plates together while a tubular, e.g. but not limited to a collapsed tubing, is held between the two plates. In one aspect, the inner area of the plates in contact with the tubular (e.g. coiled tubing) is dressed with a tough material, e.g., but not limited to, any known carbide or tungsten carbide or matrix milling material and/or inserts. In another aspect, known commercially available slip apparatuses or dies are installed on the plate inner surfaces. One such die or slip device may be used on one plate in combination with the inner surface of the other plate; or an opposed pair or pairs of such dies or slip devices, one on each plate, may be used. Also, in one aspect, pairs of dies or slip devices are used, one above the other, on the plates for added gripping capacity.

The plates may be flat or curved. Handles may be secured to or formed of one or both plates and lifting hooks may be secured to one or both plates. In one aspect each plate has end slots in opposed plate ends and bolts bolt the two plates together at the two opposed ends. In another aspect the two plates are hingedly connected at one end and releasably bolted at the other end. In another aspect two sets of dies or slips are used at the same level on the plates to hold both sides of a coiled tubing "U". In such an embodiment, one or two sets of such dies or slips may also be used below the two upper sets.

In another embodiment, typical elevator hooks or handles are used on the plates so that the holder is useful as an elevator. In one such elevator, the plates are sufficiently elongated that multiple sets of dies or slips are used at two or three different levels on the plates for added gripping and holding effects. In one aspect one or two sets of dies or slips are at a first upper level; one or two sets are at an intermediate level; and one or two sets are at a lower level. Alternatively one or both plates may have a gripping surface integral therewith, instead of or in addition to die(s) or slip(s).

In one aspect the plates may be tightened not only to grip collapsed tubing but to crush it further to insure that it is not released from between the plates.

The present invention, in certain aspects, discloses a holder for holding collapsed coiled tubing, the holder a first plate, a second plate, securement apparatus for releasably securing the plates together in a spaced-apart relationship about a portion of a collapsed tubular, and at least one gripper on one plate for gripping the collapsed tubular between the first plate and second plate; such a holder wherein the at least one gripper has a first die on the first plate and a second die device on the second plate, and the first die device disposed opposite the second die device when the holder is installed around collapsed tubular; such a holder wherein each die device has a toothed gripping surface for gripping the collapsed tubular; any such holder wherein each plate has at least two slots in sides thereof, said slots forming opposed slot pairs in the plates, said slots open to the outside and wherein the securement apparatus is a bolt releasably secured in each slot pair; any such holder with spacers on the bolts to space apart the plates when the bolts secure the plates together; any such holder wherein the spacers are elastically deformable so that the plates may be tightened to any desired spacing; any such holder wherein the at least one gripper has two upper pairs of die elements on each plate, a first pair on the first plate disposed opposite a second pair on the second plate when the plates are secured together, the die elements disposed so that they are spaced apart for gripping the collapsed tubular when the plates are secured together, and a lower die element on each plate comprising a lower pair of spaced-apart opposed die elements when the plates are secured together; any such holder wherein the at least one gripper has a surface with a shape corresponding to a shape of the collapsed tubular; any such holder wherein the surface has at least one extending edge for encompassing a portion of the collapsed coiled tubing; any such holder wherein the surface includes two outer spaced-apart edges for encompassing a portion of the collapsed tubular; any such holder wherein the surface has an outwardly protruding portion for projecting into an indentation of the collapsed tubular to facilitate gripping thereof; any such holder with an elevator hook on each plate so the holder serves as an elevator; any such holder wherein the at least one gripper is a first shaped die on a first of the plates that has a recess therein for receiving the collapsed tubular; any such holder with a second shaped die on a second of the plates, the second shaped die opposite the first shaped die, the second shaped die having a gripping end receivable in the recess of the first shaped die; any such holder wherein the at least one gripper is an amount of hard material on an inner surface of at least one of the plates; any such holder wherein the collapsed tubular is coiled tubing; any such holder wherein the upper pairs of dies are offset longitudinally above the lower die element.

The present invention discloses a method for holding a collapsed tubular that is part of a wellbore string of tubulars, the method including emplacing a holder about a portion of the collapsed tubular, the holder comprising a first plate, a second plate, securement apparatus for releasably securing the plates together in a spaced-apart relationship about a portion of a collapsed tubular, at least one gripper on one plate for gripping the collapsed tubular between the first plate and second plate, and tightening the plates together so that the at least one gripper grips the portion of the collapsed tubular; any such method wherein the collapsed tubular is collapsed coiled tubing and such a method wherein the at least one gripper has two upper pairs two upper pairs of die elements on each plate, a first pair on the first plate disposed opposite a second pair on the second plate when the plates are secured together, the die elements disposed so that they are spaced apart for gripping the collapsed tubular when the plates are secured together, and a lower die element on each plate comprising a lower pair of spaced-apart opposed die elements when the plates are secured together, and the upper pairs of dies are offset longitudinally above the lower die element.

It is, therefore, an object of at least certain preferred embodiments of the present invention to provide:

New, useful, unique, efficient, nonobvious devices and methods for a tubular holder;

Such a tubular holder which effectively holds coiled tubing;

Such a tubular holder which effectively holds crushed or collapsed coiled tubing; and, in one aspect, crushes or collapses it further to prevent its release from the holder;

Such a tubular holder which has one or more dies or slips or opposed pairs thereof for holding coiled tubing;

Such a tubular holder with opposed plates, flat or curved, which are easily installed around the tubular and easily released therefrom, and Such a tubular holder which is useful as an elevator in wellbore operations.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
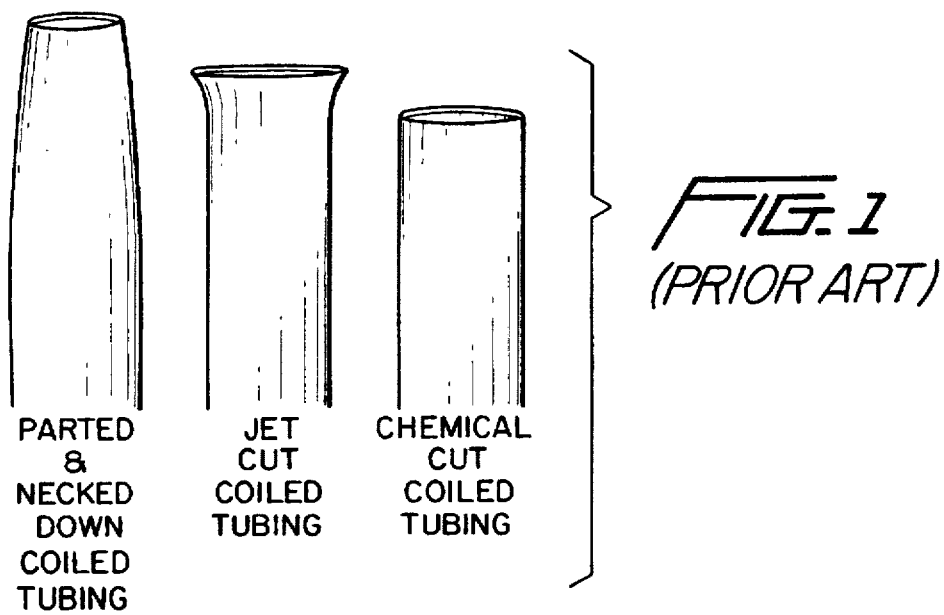
FIG. 1 shows a variety of different known types of prior art coiled tubing.
Figure 2A:
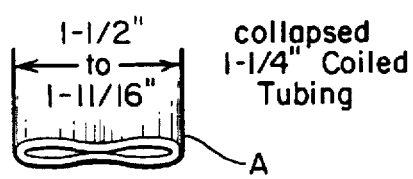
FIGS. 2A and 2B show two known types of collapsed coiled tubing.
Figure 2B:
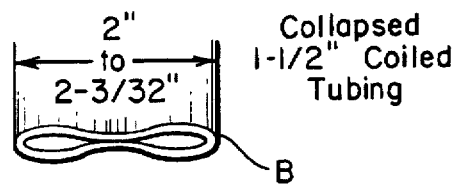
Figure 3:
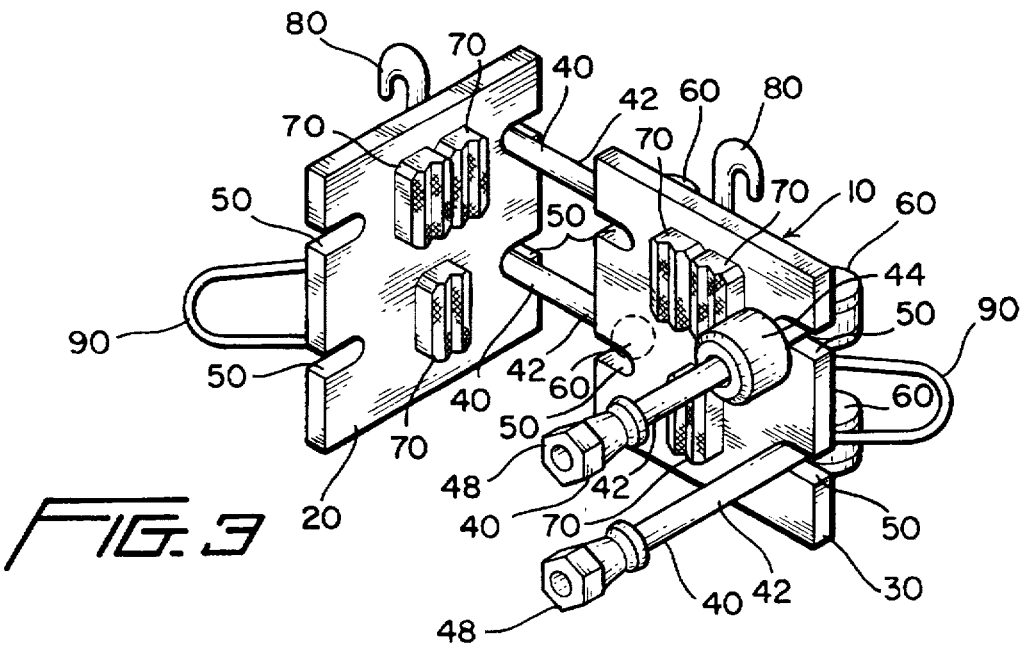
FIG. 3 is a perspective view of a tubular holder according to the present invention.

FIG. 3 shows a tubular holder 10 according to the present invention with two opposable plates 20 and 30 releasably securable opposite each other by nut-bolt combinations 40. Portions of bolts 42 of the nut-bolt combinations 40 releasably reside in slots 50 in each of the plates 20, 30. Hooks 80 on each plate facilitate lifting of the plates or of the holder, and handles 90 are provided on each plate.

Each bolt 42 has an end pivotably mounted to a hinge member 60 which itself is secured to an outer side of the plate 30. A spacer 44 threaded on one of the bolts 42 or non-threadedly emplaced thereon provide for spacing apart the plates 20, 30 a desired distance to accommodate dies 70 which are secured (e.g. by welding or with bolts) on inner plate surfaces. The spacer(s) 44 may be deleted. A spacer 44 may be used on the other bolts. Nuts 48 are also used on the bolts 42. Alternatively, bolts alone may be used in the slots 50 without any connection or hinged connection to one of the plates.

The dies 70 may be any known die or any die as shown herein. Alternatively the dies 70 may be deleted and the inner surfaces of the plates 20, 30 may be used to grip the tubular(s). In one aspect these inner surfaces are dressed with relatively harder material, e.g. known carbides, known tungsten carbides, and/or known matrix milling materials and/or known milling inserts (one or more, in any desired array or pattern, including but not limited to one or more longitudinally extending rows and/or columns of inserts of any shape, including but not limited to round, square, parallelogram, triangular, rectangular or trapezoid).

The opposed sets of dies are disposed, in one aspect, to grip therebetween crushed or collapsed coiled tubing. In such use, the nut-bolt combinations are adjusted so that the collapsed tubing is held between the plates and prevented from falling and, in one aspect, so that the tubing is not crushed further when the holder is installed. In another aspect the plates are tightened around the collapsed tubing to such an extent (e.g. by tightening the nuts 48 in embodiments using such nut-bolt combinations) that the tubing is further collapsed, even to the point of being flattened, to insure that the tubing is not inadvertently released from the holder. When toothed dies are used such tightening insures that teeth of the dies are embedded in the tubing to hold it securely.

Figure 4:
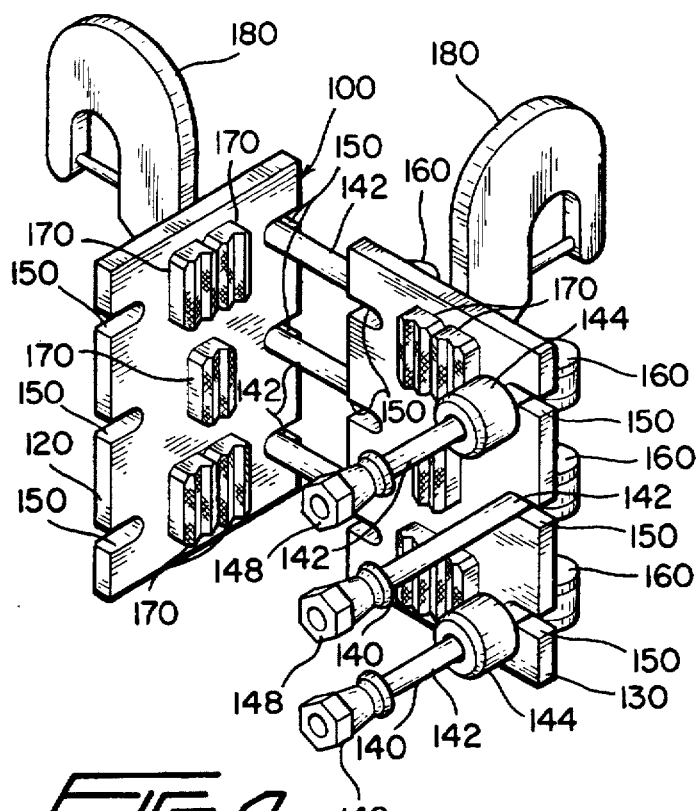
FIG. 4 is a perspective view of an elevator according to the present invention.

FIG. 4 discloses an elevator 100 according to the present invention. FIG. 4 shows a tubular holder 100 according to the present invention with two opposable plates 120 and 130 releasably securable opposite each other by nut-bolt combinations 140. Portions of bolts 142 of the nut-bolt combinations 140 releasably reside in slots 150 in each of the plates 120, 130. Elevator hooks 180 are secured to each plate and optional handles (not shown) may be provided on the plates 120, 130.

Each bolt 142 has an end pivotably mounted to a hinge member 160 which itself is secured to an outer side of the plate 130. Spacers 144 threaded on two or the bolts 142 or non-threadedly placed thereon provide for spacing apart the plates 120, 130 a desired distance to accommodate dies 170 which are secured on inner plate surfaces. The spacers 144 may be deleted so that the plates may be tightened together as desired; or the spacers may be made of a deformable elastic material which does not prevent tightening of the plates together to any desired final spacing. Nuts 148 are also used on all six bolts 142. Alternatively, bolts alone may be used in the slots 150 without any connection or hinged connection to one of the plates. The dies 170 are positioned so that when the plates 120, 130 are parallel or nearly parallel to each other with collapsed tubing therebetween, the dies on one plate are opposite to and across from the dies on another plate so that the tubing is held between the dies. Also by offsetting the middle dies on each plate longitudinally from the pairs of dies above and below the middle dies, good contact across substantially all of the width of the tubing is achieved no matter what shape the collapsed tubing has assumed. Such offset positioning also facilitates additional crushing of the tubing by tightening the plates. As shown in FIG. 3, this can be achieved with dies at only two levels. Alternatively, three or more dies or single wide dies achieve the same effect of contact across all or substantially all of a tubing's width.

Figures 5A, 5B:
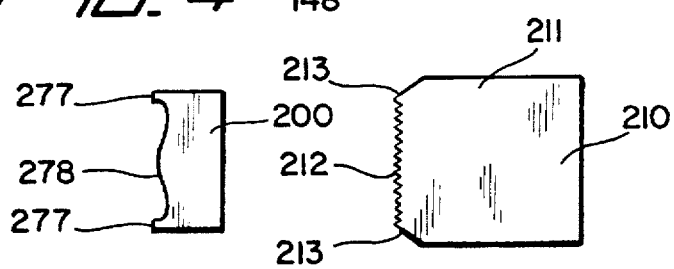
FIG. 5A is a top view of a gripping die according to the present invention.
FIG. 5B is a top view of a gripping die according to the present invention.

FIGS. 5A and 5B show a holder 200 according to the present invention with two opposable plates 220, 230 each with an upper slip 270 and a lower slip 272 secured thereto. Holes 222, 224, 232, 234 are for bolts, not shown, to bolt the two plates together around a tubular, e.g. but not limited to crushed or collapsed coiled tubing. Alternatively the two plates may be releasably connected and manipulated using any of the nut-bolt combinations described above and/or any of the hinge members.

A spacer or stop 210 bolted to the plates with a bolt 212 limits downward movement of the movable slip members and facilitates slip installation. As shown in FIG. 5B, each movable slip member (270, 272) has a body 274 with opposed recesses 276. Each die member may have, in one aspect, a toothed or serrated surface for contacting and gripping a tubular. Alternatively, this surface may be smooth. This surface may also be curved to correspond to a curved shape of a tubular to be gripped. In another aspect the slip surface is shaped and configured to correspond to a shape of a collapsed tubular. FIGS. 5A shows a die 200 with a surface shape 278. It is to be understood that any suitable shape may be used for these die surfaces. Also as seen in FIG. 5A a projecting edge 277 may be used on the die surface to further encompass a tubular held between opposed die members. This edge can project out to any desired extent, but not so far that edges on opposed die members contact and thereby impede gripping of a tubular. A set of die members with different shaped slip surfaces may be provided with any embodiment disclosed or claimed herein. Also different size die members may be provided for different O.D. tubulars.

FIG. 5B shows a die 210 according to the present invention with a die body 211 and a toothed die surface 212 with bevelled sides 214 to facilitate penetration into a tubular. Bevelled sides 213 further facilitate such penetration.

Figure 5C:
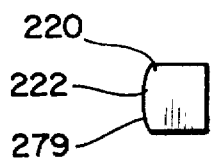
FIG. 5C is a top view of a gripping die according to the present invention.

FIG. 5C shows a die 220 according to the present invention with an outwardly curved gripping surface 222.

Figures 5D, 5E:
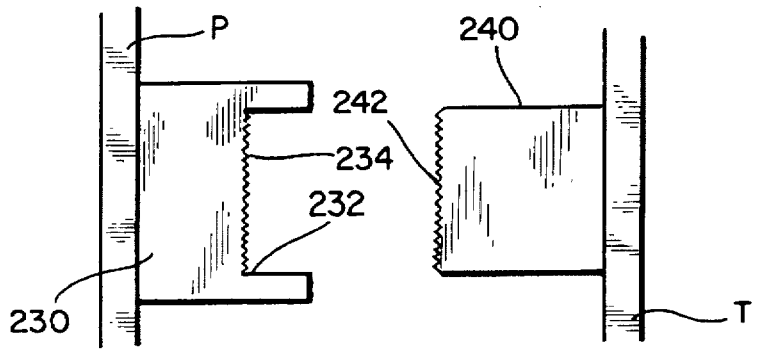
FIG. 5D is a top view of a gripping die according to the present invention.
FIG. 5E is a top view of a gripping die according to the present invention.

FIG. 5D shows a die 230 on a plate P according to the present invention with a tubular receiving recess 232 and a gripping surface 234 that may be any known gripping surface or any disclosed herein. FIG. 5E shows a corresponding die 240 on a plate T with a gripping surface 242. The die 240 is receivable in the recess 232 of the die 230 to facilitate gripping therebetween and further crushing of a collapsed tubular when such dies are used on plates like the plates 20, 30 or 120, 130.

Figure 6:
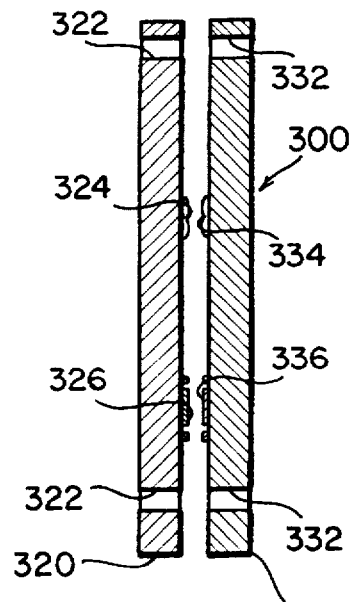
FIG. 6 is a side cross-section view of a tubular holder according to the present invention.

FIG. 6 shows a holder 300 according to the present invention with two spaced-apart plates 320, 330 with bolt holes 322, 332 respectively, for bolts to bolt the two plates together (e.g. as described above in any embodiments). An amount of hard material 324 on the plate 320 is disposed in opposition to a like amount 334 on the plate 330 for facilitating the gripping of a tubular, e.g. but not limited to collapsed coiled tubing. The amounts 324, 334 may extend to any length on the plates 320, 330 including but not limited to, from top to bottom thereof or any lesser length. Milling inserts 326, 336 may also be used secured to the plates 320, 330 respectively with or instead of the hard material 324, 326. "Hard" material includes, but is not limited to all known carbide materials, tungsten carbide material, and milling inserts. For use with premium tubulars softer materials may be used and/or with smooth outer surface for contacting the tubulars. Alternatively an amount of material on one plate (hard or soft) may be opposed by one or more milling inserts on an opposite plate.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A holder for holding collapsed coiled tubing, the holder comprising a first plate, a second plate, wherein each plate has at least two slots in sides thereof, said slots forming opposed slot pairs in the plates, said slots open to the outside and wherein the securement apparatus comprises a bolt releasably secured in each slot pair, securement apparatus for releasably securing the plates together in a spaced-apart relationship about a portion of a collapsed tubular, and at least one gripper on one plate for gripping the collapsed tubular between the first plate and second plate.

2. The holder of claim 1 further comprising the at least one gripper comprising a first die on the first plate and a second die device on the second plate, and the first die device disposed opposite the second die device when the holder is installed around collapsed tubular.

3. The holder of claim 2 wherein each die device has a toothed gripping surface for gripping the collapsed tubular.

4. The holder of claim 1 further comprising spacers on the bolts to space apart the plates when the bolts secure the plates together.

5. The holder of claim 4 wherein the spacers are elastically deformable so that the plates may be tightened to any desired spacing.

6. The holder of claim 1 further comprising the at least one gripper comprising two upper pairs of die elements on each plate, a first pair on the first plate disposed opposite a second pair on the second plate when the plates are secured together, the die elements disposed so that they are spaced apart for gripping the collapsed tubular when the plates are secured together, and a lower die element on each plate comprising a lower pair of spaced-apart opposed die elements when the plates are secured together.

7. The holder of claim 6 wherein the surface has at least one extending edge for encompassing a portion of the collapsed coiled tubing.

8. The holder of claim 6 wherein the surface includes two outer spaced-apart edges for encompassing a portion of the collapsed tubular.

9. The holder of claim 6 wherein the surface has an outwardly protruding portion for projecting into an indentation of the collapsed tubular to facilitate gripping thereof.

10. The holder of claim 6 wherein the upper pairs of dies are offset longitudinally above the lower die element.

11. A method for holding a collapsed tubular that is part of a wellbore string of tubulars, the method comprising emplacing a holder about a portion of the collapsed tubular, the holder comprising a first plate, a second plate, securement apparatus for releasably securing the plates together in a spaced-apart relationship about a portion of a collapsed tubular, at least one gripper on one plate for gripping the collapsed tubular between the first plate and second plate, tightening the plates together so that the at least one gripper grips the portion of the collapsed tubular, and wherein the at least one gripper has two upper pairs two upper pairs of die elements on each plate, a first pair on the first plate disposed opposite a second pair on the second plate when the plates are secured together, the die elements disposed so that they are spaced apart for gripping the collapsed tubular when the plates are secured together, and a lower die element on each plate comprising a lower pair of spaced-apart opposed die elements when the plates are secured together, and the upper pairs of dies are offset longitudinally above the lower die element.

12. The method of claim 11 wherein the collapsed tubular is collapsed coiled tubing.

* * * * *